Sept. 7, 1937.  A. M. BACH  2,092,663
MATERIAL HANDLING APPARATUS
Filed April 22, 1935   3 Sheets-Sheet 1
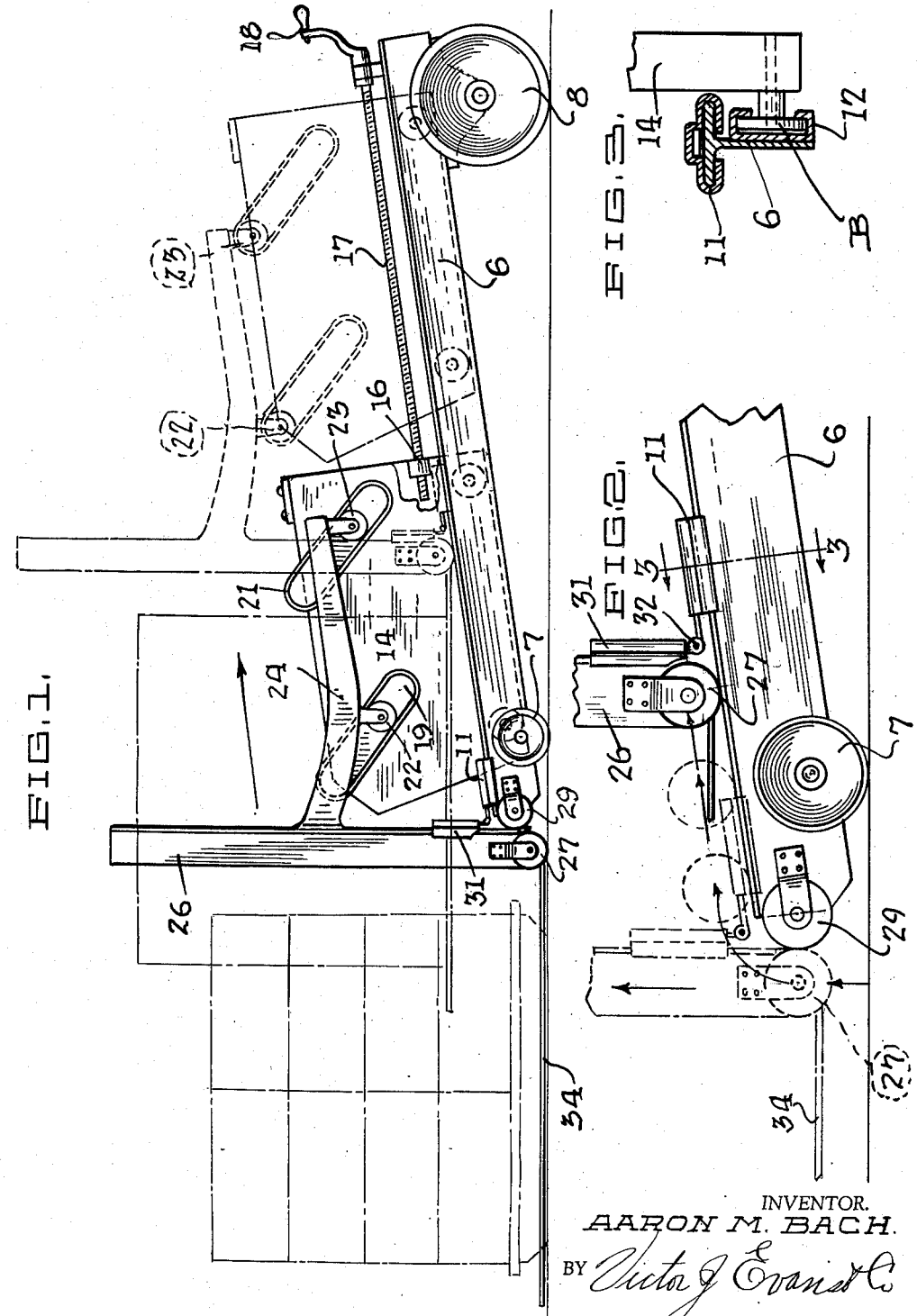
INVENTOR.
AARON M. BACH.
BY
ATTORNEYS.

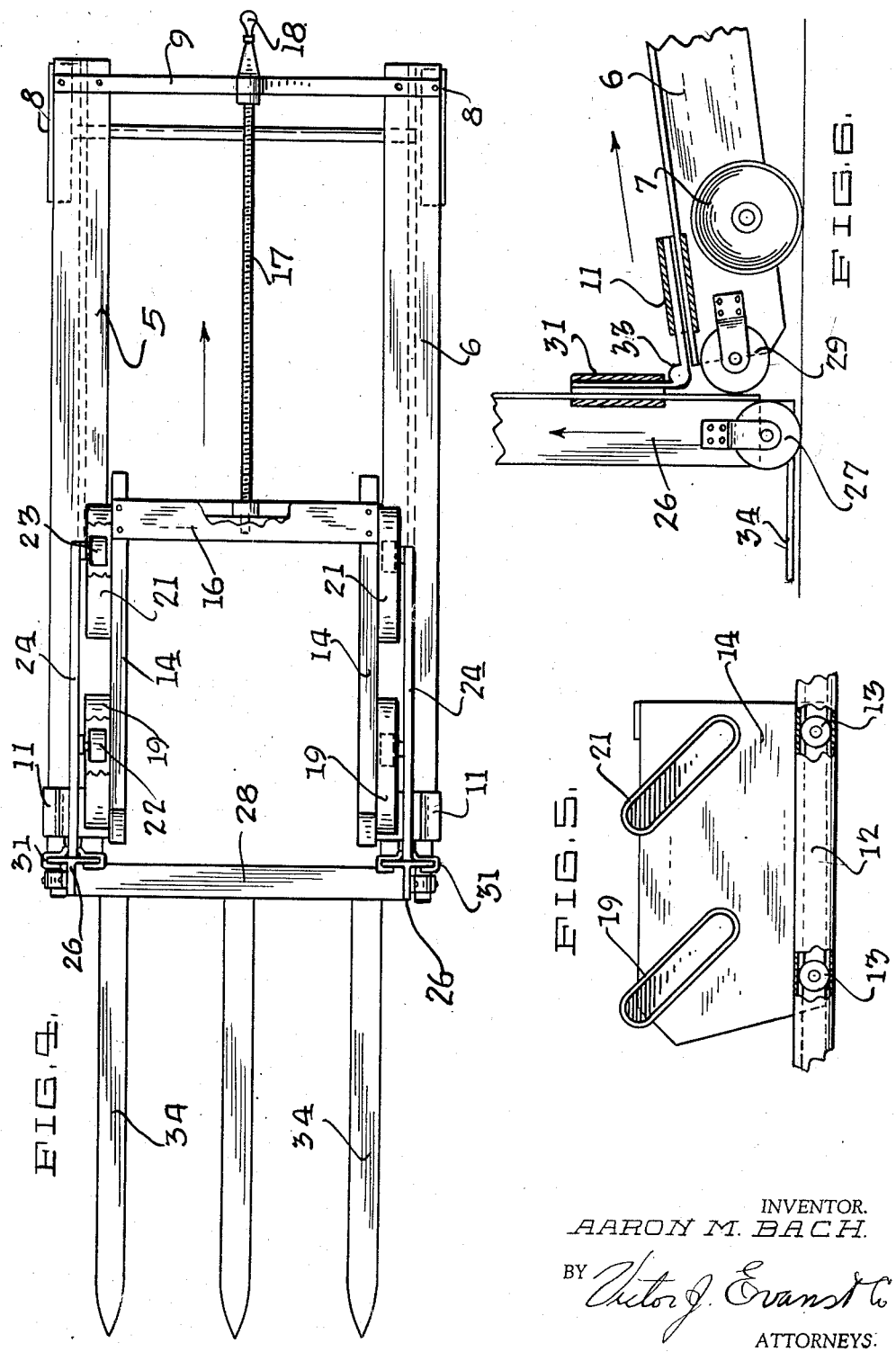

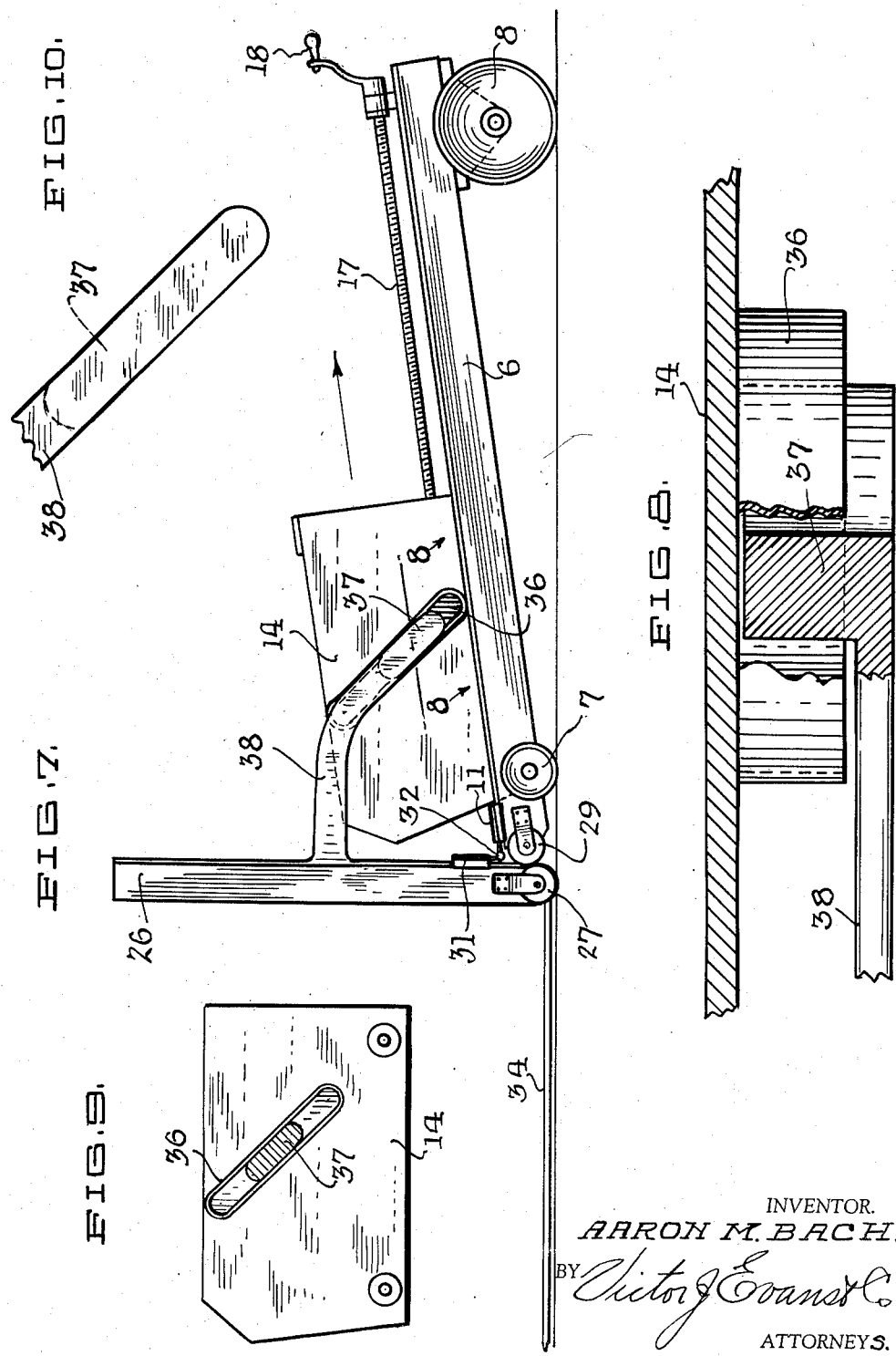

Patented Sept. 7, 1937

2,092,663

UNITED STATES PATENT OFFICE 2,092,663

MATERIAL HANDLING APPARATUS

Aaron M. Bach, San Francisco, Calif.

Application April 22, 1935, Serial No. 17,586

11 Claims. (Cl. 214—75)

This invention relates to material handling apparatus, such as power driven trucks and the like adapted for use in loading, unloading and transporting freight and other materials, and has particular reference to means associated with the truck for maintaining the load handling member in a vertical position.

The principal object is to provide an unique mechanism whereby a horizontal and vertical movement may be imparted to the load handling member with one mechanical action.

A further object is to provide a load or material handling member that has a particular field of use in raising containers that may hold chemicals or the like, so that by the simple horizontal and vertical movement imparted to the load handling member, danger of spillage will be reduced to a minimum.

In my co-pending application on a Material handling apparatus, filed January 9th, 1932, Serial No. 585,685, which has since matured into Patent No. 1,998,434, dated April 23, 1935, I have disclosed means for transmitting a longitudinal movement to the carriage and load handling mechanism, whereby during such longitudinal movement, a tilting movement and elevating movement is transmitted to the load handling member. Realizing the advantage of being enabled to maintain a load handling member in a substantially vertical position and to further realize a horizontal and vertical movement of the load handling member with one mechanical action, I have devised the present invention, which is not only economical to manufacture, effective in operation, but of such a construction that the parts thereof are not easily disarranged and, therefore, the cost of repairs will be negligible.

Other objects and advantages will be apparent during the course of the following description.

In the accompanying drawings forming a part of this specification and in which like numerals are employed to designate like parts throughout the same, Fig. 1 is a side elevation of my device, Fig. 2 is an enlarged fragmentary side elevation showing the actuation of my device, Fig. 3 is a cross sectional view on the line 3—3 of Fig. 2, Fig. 4 is a top plan view of Fig. 1, Fig. 5 is a side elevation of the elevator block, Fig. 6 is a view similar to Fig. 2, showing the elevator in its lowered position, Fig. 7 is a side elevation of a modified form of my device, Fig. 8 is an enlarged detail cross sectional view on the line 8—8 of Fig. 7, Fig. 9 is a side elevation of the elevator block of Fig. 7, and Fig. 10 is an enlarged side elevation of the sliding block.

In moving many commodities it is common practice to employ raised platforms which are elevated off the floor a few inches and to then move trucks under these platforms, pick up the load and transport it from place to place. These trucks operate only through a very short distance, and, therefore, cannot raise the load to any appreciable height.

Applicant has, therefore, devised an apparatus comprising a pair of side frames 5 and 6, which are mounted upon front wheels 7 and rear wheels 8. These side frames are spaced apart so as to lie in a parallel arrangement by a spacer 9. Slidable on the side frames are guides 11, which guides slide upon the top portion of the side frames, the purpose of which will be later seen. Secured to the adjacent surfaces of the side frames are T-shaped tracks 12 within which wheels 13 of the elevator blocks 14 move. It is, of course, understood that there is an elevator block 14 on both sides, which are connected by a cross piece 16, which cross piece is in turn connected by a threaded member 17 with the cross piece 9, and is rotated by a crank 18. Mounted upon the outer surfaces of the elevator blocks are cam tracks 19 and 21. These cam tracks 19 and 21 receive wheels 22 and 23, respectively, of the elevator arms 24, which arms are in turn connected to the elevator uprights 26, which uprights each carry a roller 27, upon its lower end and these uprights are connected by a cross piece 28. A roller 29 is connected to the front end of each of the side frames 5 and 6. The uprights 26 are slidably held in runners 31, which runners are in turn connected to the guides 11. This connection may be either a pivot as shown at 32 in Fig. 2, or a solid member as shown at 33 in Fig. 6. Prongs 34 are connected to the cross piece 28 and it is these prongs that are placed beneath the load as service for the elevating medium therefor.

In the modified form shown in Fig. 7, the construction and operation is substantially the same as that of the preferred form, the only difference being that the elevator blocks carry but a single cam track 36 in which a sliding block 37 travels. This block is formed integral with the arm 38 which corresponds to the arm 24 of Fig. 1. The remaining parts of the modified form have been given the same numerals as in the preferred form of the apparatus.

The operation of my device is as follows:—

Assuming that the parts are in the full line position of Fig. 1, it will be apparent that the prongs 34 may be placed beneath the load indicated in dotted lines at the left of the figure. By now moving the crank 18 the elevator blocks will be caused to move toward the right of the drawing of either Fig. 1 or 4. This will cause pressure to be exerted against the rollers 22 and 23, thus causing the arm 24 to move vertically. This upward movement will in turn move the uprights 26 vertically, causing the roller 27 to engage the roller 29 and to roll thereover as indicated in dotted lines of Fig. 2. This rearward movement of the elevator blocks will, therefore, first cause an upward movement of the prongs 34 which are, of course, connected to the cross piece 28 and uprights 26, and after these prongs engage the load the same will be elevated and moved from the full line position to the dotted line position of Fig. 1, in which position it will be apparent that the load may be transmitted any desired distance.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In an apparatus of the character described, spaced frame members, sliding elements mounted on said frame members, uprights slidably secured to said sliding elements, and inclined track means interposed between said sliding elements and said uprights for causing said uprights to move vertically when said sliding elements are moved rearwardly.

2. In a device of the character described, spaced frame members, sliding elements mounted on said frame members, each of said elements and its frame member being spaced from the other of said elements and its frame member, a roller secured to the end of each of said frame members, an upright slidably secured to each of said frame members and having engagement at its lower end with said rollers, each of said uprights having an arm extending therefrom, and inclined tracks carried on said elements and engaging rollers secured to said arms, and means for moving said elements on said frame members to cause relative movement between said arms and said wheels, whereby an elevation of said uprights will occur.

3. In a material handling apparatus of the class described, a supporting frame, a load engaging member carried by said frame, means associated with said frame and load engaging member whereby a vertical and a horizontal movement is imparted to said load engaging member, said means comprising anti-friction members adapted to roll one upon the other to elevate the load vertically, and means for drawing the elevated load rearwardly on said frame in a horizontal position.

4. In a material handling apparatus of the class described, a supporting frame, supporting wheels for said frame, a load engaging member carried by said frame, said load engaging member including an upright, elevator arms carried by said upright, a sliding member mounted on said frame, cams carried by said sliding member, means carried by said elevator arms and engaging said cams, anti-friction means carried by said frame and anti-friction means carried by said upright whereby the rearward movement of said sliding member causes the upright to be elevated vertically and the load to maintain a horizontal position during said rearward movement.

5. In a material handling apparatus of the class described, a supporting frame, a load engaging member associated with said frame, anti-friction means carried by the frame for elevating the load engaging member vertically from the ground level while maintaining its horizontal position, and means mounted on said frame for drawing the load along the frame.

6. In a material handling apparatus of the class described, a supporting frame, a load engaging member associated with said frame, means carried by the frame for elevating the load engaging member vertically and for maintaining its horizontal position, said means including a slide mounted in the frame, angularly positioned cam tracks carried by said slide, means carried by the load engaging member and engaging said cam tracks, and anti-friction rolls carried by said load engaging member and said frame whereby the load may be raised vertically and moved horizontally, and means for drawing said slide along the frame.

7. In a material handling apparatus of the class described, a supporting frame, a load engaging member associated with said frame, said load engaging member embodying an upright, elevator arms secured to said upright, anti-friction members carried by said arms, rollers mounted on the frame and rollers carried by the upright and normally in contact, a slide mounted in the frame and having cam tracks engaging said anti-friction members, and means for moving said slide along the frame to cause the vertical elevation of the load engaging member and to cause the same to maintain its horizontal position as the load is moved rearwardly along said frame.

8. In a device of the class described, spaced frame members, sliding elements mounted on said frame members, rollers secured to said frame members and adapted to normally support said frame members in load receiving position, anti-friction elements carried by said frame members, inclined tracks carried by said sliding elements and capable of engaging said anti-friction elements, and means associated with said sliding elements whereby rearward movement thereof causes said frame members to be raised vertically and moved rearwardly in a horizontal position.

9. In a device of the character described a supporting frame, a sliding member mounted on said frame, a load engaging member slidably mounted on the front of said frame, and means secured to the load engaging member and slidably engaging the sliding member whereby when the sliding member is retracted the load engaging member is moved vertically in front of and horizontally along the supporting frame, the load engaging member remaining vertical during its transportation.

10. In a device of the character described, a frame, a carriage slidably mounted on said frame, an upright slidably secured to the end of said frame, an arm secured to said upright and slidably engaging said carriage, means for moving the carriage horizontally on said frame, whereby the upright is moved vertically and horizontally.

11. In an apparatus of the character described, a support, a carriage mounted to travel thereon, means for imparting longitudinal movement to the carriage, a load handling member disposed in front of the carriage, a connection between the load handling member and the carriage, and means co-operating with the carriage and the load handling member whereby longitudinal movement, and elevating movement are transmitted to the load handling member during longitudinal movement of the carriage.

AARON M. BACH.